US007011763B2

(12) United States Patent
Clark

(10) Patent No.: US 7,011,763 B2
(45) Date of Patent: Mar. 14, 2006

(54) FIRE EXTINGUISHING OR RETARDING MATERIAL

(75) Inventor: Kirtland P. Clark, Mansfield, TX (US)

(73) Assignee: Chemguard Incorporated, Mansfield, TX (US)

( * ) Notice: Subject to any disclaimer, the term of this patent is extended or adjusted under 35 U.S.C. 154(b) by 513 days.

(21) Appl. No.: 10/213,703

(22) Filed: Aug. 6, 2002

(65) Prior Publication Data

US 2003/0141081 A1 Jul. 31, 2003

Related U.S. Application Data

(60) Provisional application No. 60/336,852, filed on Nov. 27, 2001.

(51) Int. Cl.
*A62D 1/02* (2006.01)
*A62D 1/04* (2006.01)
*C09K 21/08* (2006.01)
*C09K 21/14* (2006.01)

(52) U.S. Cl. ................... 252/3; 252/2; 252/8; 252/601; 252/610; 252/611; 252/6.5

(58) Field of Classification Search .................... 252/2, 252/3, 8.05, 601, 602, 604, 610, 611; 169/45, 169/46, 47
See application file for complete search history.

(56) References Cited

U.S. PATENT DOCUMENTS

| | | | | |
|---|---|---|---|---|
| 3,422,011 | A | 1/1969 | Jackovitz et al. | |
| 3,457,172 | A | 7/1969 | Stewart et al. | |
| 3,562,156 | A | 2/1971 | Francen | |
| 3,579,446 | A | 5/1971 | Kroke et al. | |
| 3,957,657 | A | 5/1976 | Chiesa, Jr. | |
| 4,060,132 | A | 11/1977 | Chiesa, Jr. | |
| 4,060,489 | A | 11/1977 | Chiesa, Jr. | |
| 4,303,534 | A | 12/1981 | Hisamoto et al. | |
| 4,306,979 | A | 12/1981 | Tsuji | |
| 4,387,032 | A | 6/1983 | Chiesa, Jr. | |
| 4,420,434 | A | 12/1983 | Falk | |
| 4,424,133 | A * | 1/1984 | Mulligan | 252/8.05 |
| 4,464,267 | A | 8/1984 | Chiesa, Jr. et al. | |
| 4,472,286 | A | 9/1984 | Falk | |
| 4,999,119 | A | 3/1991 | Norman et al. | |
| 5,085,786 | A | 2/1992 | Alm et al. | |
| 5,207,932 | A * | 5/1993 | Norman et al. | 252/3 |
| 5,218,021 | A | 6/1993 | Clark et al. | |
| 5,616,273 | A | 4/1997 | Clark et al. | |
| 5,750,043 | A | 5/1998 | Clark | |
| 5,998,521 | A * | 12/1999 | Fan et al. | 524/225 |
| 6,015,838 | A * | 1/2000 | Stern et al. | 516/12 |
| 6,156,222 | A | 12/2000 | Jennings et al. | |
| 2002/0030176 | A1 * | 3/2002 | Shaffer et al. | 252/3 |
| 2002/0033466 | A1 * | 3/2002 | Shaffer et al. | 252/3 |

FOREIGN PATENT DOCUMENTS

| | | |
|---|---|---|
| DE | 19710108 | 10/1997 |
| EP | 0765676 A1 | 4/1997 |
| GB | 2311219 | 9/1997 |
| WO | WO 96/33777 | * 10/1996 |

* cited by examiner

*Primary Examiner*—Joseph D. Anthony
(74) *Attorney, Agent, or Firm*—Grady K. Bergen

(57) ABSTRACT

A foam concentrate or fire fighting composition for extinguishing and/or retarding fires is provided that meets UL162, Class B performance criteria for at least one of AFFF agents, AR-AFFF agents and fluoroprotein (FP) agents. The concentrate is used to form the fire fighting composition when mixed with water. The concentrate or fire fighting composition includes a high molecular weight fluoropolymer and water and may have a fluorine content wherein less than about 0.008% fluorine by weight of the fire fighting composition is provided from any fluorochemical surfactant. Further, the composition may meet the UL162, Class B performance criteria without forming a stable seal on cyclohexane.

33 Claims, No Drawings

FIRE EXTINGUISHING OR RETARDING MATERIAL

This application claims the benefit of U.S. Provisional Patent Application No. 60/336,852, filed Nov. 27, 2001.

BACKGROUND

The prior art teaches the use of aqueous film forming foam (AFFF) agents for the rapid extinguishment of Class B fires and enhancement of safety by providing flashback or burnback resistance. First described by Francen in U.S. Pat. No. 3,562,156, AFFF agents by definition must have a positive spreading coefficient on cyclohexane. Many US patents describe the composition of AFFF agents which meet the positive spreading coefficient criteria as do U.S. Pat. Nos. 4,420,434; 4,472,286; 4,999,119; 5,085,786; 5,218,021 and 5,616,273.

All of the prior art has one common element; the requirement of various quantities and types of fluorochemical surfactants to obtain the positive spreading coefficient when combined with various hydrocarbon surfactants. U.S. Pat. No. 5,616,273 describes today's AFFF and alcohol-resistant aqueous film forming foam (AR-AFFF) agents used to generate aqueous film forming foams having fluorine contents ranging from 0.020 to 0.044 percent in premix form. The actual fluorine level has been dependant on the required performance specifications with higher fluorine content providing faster extinguishing performance and greater burn back resistance. The lowest fluorine content product (0.020% F) would contain about 1.3% by weight fluorochemical surfactant solids in the 3% liquid concentrate since these products contain about 50% by weight fluorine.

The criterion necessary to attain spontaneous spreading of two immiscible liquids has been taught by Harkins et al, *Journal Of American Chemistry,* 44, 2665 (1922). The measure of the tendency for spontaneous spreading of an aqueous solution over the surface of non-polar solvents such as hydrocarbons is defined by the spreading coefficient (SC) and can be expressed as follows:

$$SC_{a/b}=\gamma_a-\gamma_b-\gamma_I, \quad (1)$$

where, $SC_{a/b}$=Spreading Coefficient;

$\gamma_a$=Surface tension of the lower hydrocarbon phase;

$\gamma_b$=Surface tension of the upper aqueous phase; and $\gamma_I$=Interfacial tension between the aqueous upper phase and the lower hydrocarbon phase.

If the SC is positive, by theory an aqueous solution should spread and film formation on top of the hydrocarbon surface should occur. The more positive the SC, the greater the spreading tendency will be. However, in practice it has been found that no visible film seal occurs on cyclohexane until the SC is greater than about +3.5 to about +4.0, especially if the fluorochemical content is low. It is further known in the art that $\gamma_a$ is reduced as the temperature of the hydrocarbon is increased, as occurs during the burning of these fuels. This will lower the effective SC during fire extinguishing unless the fire extinguishing solution also has decreasing $\gamma_b$ on increasing temperature.

Fluorochemical surfactants have recently come under fire by the EPA and environmental groups. In fact, 3M agreed in May 2000 to stop the manufacture of perfluorooctanesulfonate (PFOS) and perfluorooctanoic acid (PFOA) based products including fluorinated surfactants used in AFFF and AR-AFFF agents. The EPA, prior to May 2000, had determined that PFOS posed a long-term threat to the environment after PFOS was found in all animals tested and was determined to be toxic after various long-term feeding studies. The EPA has since initiated a program requiring other perfluorochemical producers to supply information on their products to the EPA. This will allow the EPA to evaluate potential environmental problems from other fluorochemical surfactants already in the marketplace.

It is therefore desirable to have fire extinguishing products which do not contain fluorochemical surfactants, while extinguishing Class B fires as well as AFFF agents, since they should escape most EPA/environmental scrutiny.

The instant invention provides compositions that require little or no use of fluorochemical surfactants, yet the novel fire fighting liquid concentrates still meet or exceed Aqueous Film Forming Foam agent (AFFF) performance criteria on Class B, UL162 fires. If fluorochemical surfactant use is severely curtailed by the EPA, these agents could be important for the future of firefighting.

The commercial AFFF agent market consists most importantly of products which are UL listed such that consumers can be assured of minimum performance characteristics of AFFF agents. The UL 162 Standard for Safety covers Foam Equipment and Liquid Concentrates. Section 3.16, UL162 (Seventh edition, 1997) defines six liquid concentrates recognized by UL as low expansion liquid concentrates. Part a) defines Aqueous Film Forming (AFFF) as "a liquid concentrate that has a fluorinated surfactant base plus stabilizing additives." Part b) defines Protein as "a liquid concentrate that has a hydrolyzed protein plus stabilizing additives." Part c) defines Fluoroprotein (FP) as "a liquid concentrate that is similar to protein, but with one or more fluorinated surfactant additives." Part d) defines Film Forming Fluoroprotein (FFFP) as "a liquid concentrate that has both a hydrolyzed protein and fluorinated surfactant base plus stabilizing additives." Part e) defines Synthetic as "a liquid concentrate that has a base other than fluorinated surfactant or hydrolyzed protein. Finally Part f) defines Alcohol Resistant as "a liquid concentrate intended to extinguish both hydrocarbon and polar (water miscible) fuel fires."

Fire test foam application and duration to burn back ignition is given in UL162 Table 10.1 for Class B fire tests. These minimum performance criteria must be met for liquid concentrates to be "UL listed" as Class B liquid concentrates. Of the six liquid concentrates defined by UL162, only protein and synthetic do not contain fluorosurfactant and, of these, only protein has UL listed products for use on Class B liquid fires. At this time, synthetic liquid concentrates are only UL listed as wetting agents and defined by UL as "liquid concentrates which, when added to plain water in proper quantities, materially reduce the surface tension of plain water and increases its penetration and spreading ability . . . Listed wetting agents solutions or foams improve the efficiency of water in extinguishing fires."

DETAILED DESCRIPTION

The invention provides compositions for use as fire extinguishing concentrates, which meet or exceed Fluoroprotein (FP), AFFF and AR-AFFF performance criteria on Class B, UL162 fires, but without the need of fluorochemical surfactants, as required in the prior art. These compositions include synthetic liquid concentrates stabilized with high molecular weight fluorinated polymers (HMW-FP), which extinguish both non-polar Class B type fires and polar fires. No fluorosurfactants are required to meet the UL162 standard, but may be used to improve extinguishing speed and burnback times, if desired.

The invention further provides a method of extinguishing Class B fires using novel fire fighting compositions having no added fluorochemical surfactant or with very low fluorochemical surfactant content. This method provides fast extinguishment and burn back similar to that provided by FP agents, as well as AFFF agents having high fluorochemical surfactant content.

It has been found that synthetic liquid concentrate can be stabilized to Class B liquid fire performance (UL162) with the addition of various foam stabilizing polymeric additives. The effectual polymeric additive and the effective level necessary for improving the synthetic liquid concentrate may be identified and determined through a laboratory test. Especially effective in stabilizing the synthetic liquid concentrate foam bubble to Class B liquids are high molecular weight polymers (HMW-FPs) containing perfluorinated substituents, including commercial products such as Lodyne 5100 marketed by Ciba Specialty Chemicals Corporation, Basel, Switzerland; Chemguard FP-111 and FP-211, available from Chemguard Incorporated, Mansfield, Tex.; and Dynax 5011, marketed by Dynax Corporation, Elmsford, N.Y. All of these products are additives for use in polar type AFFF (AR-AFFF) agents. They are known to act in AR-AFFF formulations by staying in the foam bubble and laying down a thin vapor-impervious film between the polar water-soluble solvent and the foam-water layer as the first bubbles are attacked by the solvent.

The present invention may also provide protein-based fire extinguishing agents without the use of fluorochemical surfactants.

HMW-FP has lower toxicity compared to monomeric fluorochemical surfactants. In fact, it is much easier to list polymers (none reactive) on the TOSCA inventory than low molecular weight materials. Similarly, in Europe, polymers are exempt from the EINICS list. It is widely understood that as polymers increase in MW, their absorption rate through skin decreases. Further, high MW polymers rapidly adsorb to solid surfaces such as dirt, rocks, etc, and are much less available for entering water ways. Therefore, they are in general more environmentally benign than low MW surfactants and chemicals.

The present invention pertains to novel fire extinguishing compositions especially useful for extinguishing UL162 Class B polar (water soluble) and non-polar (water insoluble) liquid fires by the addition of effectual HMW-FP to various synthetic liquid concentrates at effective levels. The effectual polymer and the effective level may be determined through a laboratory test described under the Experimental Section below.

The synthetic surfactant liquid compositions may be produced at many strengths including but not limited to 1, 3 and 6% by weight foam concentrates, which are typical commercial concentrations. The concentrates may also be less than 1% by weight to greater than 6% by weight or even 10% by weight, if desired. The lowest numbered strength for the concentrate is actually the most concentrated product. Therefore, one part of 1% concentrate and 99 parts water gives 100 parts of use strength pre-mix, whereas, three parts 3% and 97 parts water gives 100 parts of pre-mix. As used herein, the term “water” may include pure, deionized or distilled water, tap or fresh water, sea water, brine, or an aqueous or water-containing solution or mixture capable of serving as a water component for the fire fighting composition.

For the sake of simplicity only 3% concentrate products are exemplified here, while it will be readily understood by those skilled in the art that many other strength products may be used. Unless stated otherwise, all percentages presented herein for compositions are based on weight. A general composition for a 3% liquid concentrate (used at 3 parts concentrate to 97 parts fresh or tap water) may include the following components:

| Component | % by weight (100%) |
|---|---|
| A High MW fluorinated polymer (HMW-FP) | 0.2–10 |
| B Amphoteric Hydrocarbon Surfactant | 0–3 |
| C Anionic Hydrocarbon Surfactant | 2–10 |
| D Nonionic Hydrocarbon surfactant | 0–5 |
| E Fluorochemical Surfactant | 0–0.4 |
| F Foam aids including glycol ethers | 0–15 |
| G Freeze protection package | 0–45 |
| H Sequestering, buffer, corrosion package | 0–5 |
| I Polymeric film formers | 0–2 |
| J Biocides, antimicrobial | 0–0.1 |
| K Electrolytes | 0–3 |
| L Polymeric foam stabilizers and thickeners | 0–10 |
| M Water | Balance |

The above components would be reduced or increased accordingly relative to the 3% liquid concentrate to prepare 6% and 1% synthetic liquid foam concentrates, or other concentrate levels. Thus, for a 1% concentrate, the above amounts may be increased by a factor of 3, whereas for a 6% concentrate the above amounts may be reduced by half.

Most Class A foam concentrates fit within the definition of the base surfactant defined above. Therefore, one may also add an effectual HMW-FP (as may be determined from the laboratory test described) to many Class A foam concentrates. Similarly, an effectual HMW-FP may also be added to 3 or 6% liquid protein concentrate containing no or limited amounts of fluorochemical surfactant.

The HMW-FPs (Component A) are products prepared from perfluorinated monomers, either mono- or polyfunctional, polymerized with reactive polyfunctional monomers, prepolymers or high MW polymers with appropriate reactive sites. As used herein with respect to the fluoropolymers described, high molecular weight (HMW) is construed to encompass those polymers having an average molecular weight of from about 3000 g/mol or greater, more particularly those having an average molecular weight of from about 5000 g/mol or greater, and still more particularly those having an average molecular weight of from about 10,000 g/mol, 20,000 g/mol, 30,000 g/mol, 50,000 g/mol or greater. A suitable range may include those having an average molecular weight of from about 5,000 g/mol, 10,000 g/mol, 20,000 g/mol or 30,000 g/mol to about 100,000 g/mol, 150,000 g/mol or more. Those soluble polymers having relatively higher molecular weights may be particularly well suited.

Examples of suitable fluoropolymers include, but are not limited to, those described in U.S. Pat. Nos. 6,156,222, 5,750,043 and 4,303,534 and European Patent No. EP 0 765 676 A1, which are herein incorporated by reference. Szonyi and Cambon describe a suitable addition polymer between Fluotan B830, a perfluoro alkyl polyamine, and xanthan gum in *Fire Safety Journal,* 16, (1990), pages 353–365, which is incorporated herein by reference. Another suitable perfluorinated polymer is prepared from (hydroxypropyl) cellulose (Hercules Klucel, MW=60,000) and perfluorooctanyl chloride, as described in Macromolecules, 27, 1994, pages 6988–6990, which is incorporated herein by reference.

One suitable commercially available polymer (Component A) is Lodyne 5100, which is a high MW perfluorinated polyamino acid (anionic) and contains approximately 19% fluorine by weight of solids. Other commercially available polymers include high MW perfluorinated polyols, available as Chemguard FP-111, which is a non-anionic polyol and contains approximately 17% fluorine by weight of solids, and Chemguard FP-211. Chemguard FP-111 has perfluoro-tails from $C_6$–$C_{12}$ while Chemguard FP-211 has only $C_4$ perfluoro-tails ($CF_3CF_2CF_2CF_2$—).

Dynax 5011 is a relatively lower molecular weight (i.e. MW ~5000 g/mol) anionic polymer containing about 18% fluorine by weight of solids, did not work well alone, but did when combined with Lodyne 5100 as a 50/50 mixture. Therefore, it has been found that poorer performing polymers can be used effectively if mixed with higher efficiency polymers such as Lodyne 5100 or Chemguard FP-111.

The high molecular weight fluoropolymers may be used in an amount to provide a foam concentrate that may have from about 0.005% or less to about 6% or more fluorine by weight of concentrate, more typically from about 0.01% to about 4.5% fluorine by weight of concentrate. The final fire fighting foam or composition may have a fluorine content of from about 0.0003% to about 0.065% fluorine by weight of solution, with from about 0.0006% to about 0.05% by weight fluorine from the fluoropolymers being typical, and from 0.001% to about 0.035% by weight fluorine being more typical. The amounts of fluorine from the fluoropolymer will vary in the concentrate depending upon the type of concentrate employed. Thus a 3% concentrate may have from about 0.01% by weight fluorine to about 2% by weight fluorine from the HMW-FP, with from about 0.02% to about 1.5% by weight being typical and from about 0.05% to about 1% by weight being more typical. A 1% foam concentrate may have from about 0.03% to about 6% by weight fluorine from the HMW-FP, with from about 0.06% to about 4.5% by weight fluorine being typical, and from about 0.15% to about 3% by weight fluorine being more typical. A 6% concentrate may have from about 0.005% to about 1% by weight fluorine from the HMW-FP, with from about 0.01% to about 0.5% by weight fluorine being typical, and from about 0.025% to about 0.4% by weight fluorine being more typical.

Amphoteric hydrocarbon surfactants (Component B) include, but are not limited to, those which contain in the same molecule, amino and carboxy, sulfonic, sulfuric ester and the like. Higher alkyl (C6–C14) betaines and sulfobetaines are included. Commercially available products include Chembetaine CAS and Mirataine CS, both sulfobetaines, and Deriphat 160C, a C12 amino-dicarboxylate. These products are foaming agents and help reduce interfacial tension in water solution.

Anionic hydrocarbon surfactants (Component C) include, but are not limited to, alkyl carboxylates, sulfates, sulfonates, and their ethoxylated derivatives. Alkali metal and ammonium salts are suitable. The C8–C16 hydrocarbon surfactants are suitable, with more narrowly the C8–C12, and still more narrowly the C8–C10 being suitable.

The nonionic hydrocarbon surfactants (Component D) help reduce interfacial tension and solubilize other components, especially in hard water, sea water or brine solutions. In addition, they serve to control foam drainage, foam fluidity, and foam expansion. Suitable nonionic surfactants include, but are limited to, polyoxyethylene derivatives of alkylphenols, linear or branched alcohols, fatty acids, alkylamines, alkylamides, and acetylenic glycols, alkyl glycosides and polyglycosides, as defined in U.S. Pat. No. 5,207,932 (herein incorporated by reference) and others, and block polymers of polyoxyethylene and polyoxypropylene units.

While the use of fluorochemical surfactants (Component E) may be eliminated, they may be useful at certain levels. The fluorochemical surfactants are typically single perfluoro-tail molecules and may have multiple hydrophilic heads. Examples of fluorochemical surfactants can be found in the many of the AFFF-related patents, including, but not limited to, those described in U.S. Pat. Nos. 5,616,273, 5,218,021; 5,085,786; 4,999,119; 4,472,286; 4,420,434; 4,060,489, which are herein incorporated by reference.

Quantities of fluorochemical surfactant may be added to increase extinguishing speed and burnback resistance. The total fluorochemical surfactant content may be less than one-half of the typical workable levels in the absence of the fluorinated polymers to provide UL162 Class B fire performance. The fluorosurfactant may provide less than about 0.2% or 0.1% fluorine in a 3% concentrate, or less than about 0.006% or 0.003% fluorine, respectively, at the working strength. Fluorine content provided by any fluorosurfactant in the final or working fire fighting composition may be less than 0.002% or even 0.001% fluorine by weight of the working composition. This compares very favorably with data of U.S. Pat. No. 5,207,932 leading to a commercial product with low end working fluorine content of 0.013% fluorine (a 55% reduction in fluorine content).

Foam aids (Component F) are used to enhance foam expansion and drain properties, while providing solubilization and anti-freeze action. Useful foam aids are disclosed in U.S. Pat. Nos. 5,616,273, 3,457,172; 3,422,011 and 3,579,446, which are herein incorporated by reference.

Typical foam aids are alcohols or ethers such as: ethylene glycol monoalkyl ethers, diethylene glycol monoalkyl ethers, propylene glycol monoalkyl ethers, dipropylene glycol monoalkyl ethers, triethylene glycol monoalkyl ethers, 1-butoxyethoxy-2-propanol, glycerine, and hexylene glycol.

The freeze protection package (Component G), include glycerine, ethylene glycol, diethylene glycol, and propylene glycol. Also included are salts and other solids which reduce freeze point such as calcium, potassium, sodium and ammonium chloride and urea.

Component H, the sequestering, buffer, and corrosion package, are sequestering and chelating agents exemplified by polyaminopolycarboxylic acids, ethylenediaminetetraacetic acid, citric acid, tartaric acid, nitrilotriacetic acid, hydroxyethylethylenediaminetriacetic acid and salts thereof. Buffers are exemplified by Sorensen's phosphate or Mcllvaine's citrate buffers. Corrosion inhibitors are only limited by compatibility with other formula components. These may be exemplified by ortho-phenylphenol, toluyl triazole, and many phosphate ester acids.

Component I is a water soluble polymeric film former and may be used for the formulation of AR-AFFF (alcohol resistant) agents which are used to fight both polar (water soluble) and non-polar solvent and fuel fires. These polymeric film formers, dissolved in AR-AFFF agents, precipitate from solution when the bubbles contact polar solvents and fuel, and form a vapor repelling polymer film at the solvent/foam interface, preventing further foam collapse. Examples of suitable compounds include thixotropic polysaccharide gums as described in U.S. Pat. Nos. 3,957,657; 4,060,132; 4,060,489; 4,306,979; 4,387,032; 4,420,434; 4,424,133; 4,464,267, 5,218,021, and 5,750,043, which are herein incorporated by reference. Suitable commercially available compounds are marketed as Rhodopol, Kelco, Keltrol, Actigum, Cecal-gum, Calaxy, and Kalzan.

Gums and resins useful as Component I include acidic gums such as xanthan gum, pectic acid, alginic acid, agar, carrageenan gum, rhamsam gum, welan gum, mannan gum, locust bean gum, galactomannan gum, pectin, starch, bacterial alginic acid, succinoglucan, gum arabic, carboxymethylcellulose, heparin, phosphoric acid polysaccharide gums, dextran sulfate, dermantan sulfate, fucan sulfate, gum karaya, gum tragacanth and sulfated locust bean gum.

Neutral polysaccharides useful as Components I include: cellulose, hydroxyethyl cellulose, dextran and modified dextrans, neutral glucans, hydroxypropyl cellulose, as well, as other cellulose ethers and esters. Modified starches include starch esters, ethers, oxidized starches, and enzymatically digested starches.

Components J, antimicrobials and preservatives, may be used to prevent biological decomposition of natural product based polymers incorporated as Components I. Included are Kathon CG/ICP and Givgard G-4–40 manufactured by Rohm & Haas Company and Givaudan, Inc., respectively, and are disclosed in U.S. Pat. No. 5,207,932, which is herein incorporated by reference. Additional preservatives are disclosed in the above-mentioned polar agent patents—U.S. Pat. Nos. 3,957,657; 4,060,132; 4,060,489; 4,306,979; 4,387,032; 4,420,434; 4,424,133; 4,464,267, 5,218,021, and 5,750,043.

Components K include electrolytes that may be added to AFFF and AR-AFFF agents to balance the performance of such agents when proportioned with water ranging from soft to very hard, including sea water or brine, and to improve agent performance in very soft water. Typical electrolytes are salts of monovalent or polyvalent metals of Groups 1, 2, or 3, or organic bases. The alkali metals particularly useful are sodium, potassium, and lithium, or the alkaline earth metals, especially magnesium, calcium, strontium, and zinc or aluminum. Organic bases might include ammonium, trialkylammonium, bis-ammonium salts or the like. The cations of the electrolyte are not critical, except that halides may not be desirable from the standpoint of metal corrosion. Sulfates, bisulfates, phosphates, nitrates and the like are acceptable. Examples of polyvalent salts include such things as magnesium sulfate and magnesium nitrate.

Components L are polymeric foam stabilizers and thickeners which can be optionally incorporated into AFFF and AR-AFFF agents to enhance the foam stability and foam drainage properties. Examples of polymeric stabilizers and thickeners are partially hydrolyzed protein, starches, polyvinyl resins such as polyvinyl alcohol, polyacrylamides, carboxyvinyl polymers, polypyrrolidine, and poly(oxyethylene) glycol.

Many commercial synthetic surfactant concentrates are marketed worldwide and include those available from Chemguard, Kidde, and Tyco. High MW perfluorinated polymers may be added to these liquid concentrates at an effective concentration. These products include: Class A foams (CLASS A PLUS and SILVEX), excellent for extinguishing forest fires, structural fires, and tire fires; high expansion foams sold under the names HI-EX, EXTRA, C2, and VEE-FOAM; vapor suppressant foam sold by Chemguard as VRC foam; bomb foam, a 6% product sold by Chemguard as AFC-380.

Synthetic surfactant concentrates listed as "wetting agents" by Underwriters Laboratory may also be included as base surfactant mixtures for use in this invention. Products listed by UL as "wetting agents" are as follows: Fire Strike by Biocenter Inc.; Bio-Fire by Envirorenu Technologies LLC; Enviro-Skin 1% by Environmental Products Inc.; F-500 by Hazard Control Technologies Inc.; Knockdown by National Foam Inc.; Phos-Chek WD881 by Solutia Inc.; Flameout by Summit Environmental Corp. Inc. Micro-Blazeout by Verde Environmental Inc.; Bio-solve by Westford Chemical Corp.

In the examples below, references are made to specifications or procedures that may be used in the industry to evaluate the efficiency of synthetic surfactant concentrates. More specifically, the examples refer to the following specifications and laboratory test methods:

1. Surface Tension and Interfacial Tension: According to ASTM D-1331-56.

Based on laboratory tests, the surface tension of cyclohexane used for calculating the SC was 24.7 dynes/cm. The SC against cyclohexane for the fire fighting compositions described herein may range from about −4 to 4 or more, without forming a film at 23° C.

2. Laboratory Film Spreading and Burn back Test: This Test Can Be Carried Out to Determine Film Speed and Film Formation of Synthetic Surfactant Premixes on Cyclohexane.

A 100×20 mm pyrex petri dish is placed over a dark, wet surface, so that good visual observation is possible. 50 ml cyclohexane solvent is added to the petri dish. A 0.5 inch long stainless steel wood screw, pointing upwards, is placed in the center of the dish. The timer is started simultaneously 3 ml of premix are added dropwise from a pipette in one-second intervals onto the top of the screw.

When the surface of the solvent is completely covered with the film, the time of seal is recorded. The timer is left running and the screw is removed carefully so as not to disturb the film layer. With a lighter, the surface is tested for completeness of a seal. If the seal is not complete or is broken, the solvent will ignite or flash. The flames are extinguished by smothering and the result is recorded. A stable seal is formed if after two minutes from when the seal is formed the fuel will not ignite when a flame is brought near the surface of the fuel.

3. Laboratory Foam Expansion and Drain Time Test.

100 ml of a premix to be tested is prepared with either tap or artificial sea-water (as defined by ASTM D1141). 100 ml of premix is poured into a Waring Blender with a glass canister. At mix speed, the premix solution is blended for 20 seconds. The generated foam is poured into a graduated 1000 ml cylinder. The foam height is recorded and the foam expansion ratio is calculated by dividing foam volume (ml) by foam weight (g).

The time which passes between the time the blender has stopped and when the drain in the graduated cylinder reaches 25.0 ml is recorded. This time is called the ¼ drain time.

4. Laboratory Hot Heptane Foam Stability Test.

This test may be carried out to determine which of the many commercial HMW-FPs may be useful and what concentration may be necessary to provide the desired fire extinguishing performance.

The polymer or polymer mixture being evaluated is formulated typically at about 0.3–0.5% fluorine content into a 3% synthetic liquid concentrate (Blank A, Table 1). The concentrate is made into a premix and then is foamed using the procedure of Test Method 3, described above.

Heptane is heated to about 73° C. and 150 ml is poured into each of two 1000 ml beakers set into insulating panels to the 150 ml level. When the temperature reaches about 70° C., 150 ml of pre-made foam is poured into each beaker. Begin timing as soon as each heptane layer is fully covered with foam. Note: Water may immediately begins to drain from the foam and passes through the heptane to the bottom of the beaker. As foam continues to drain and break down, vapor bubbles near the heptane surface are broken, such as with a pipette. Finally, the foam layer thins and the heptane layer breaks through to the air. When the heptane layer begins to break such that approximately 1% of heptane surface is open, the timer is stopped. Foam Life is calculated by the equation:

$$\text{Foam Life (minutes)}=FO_t-FC_t \quad (2)$$

where, $FC_t$=Foam Cover Time $FO_t$=Time Foam Opens to 1%

Foam Life may include the average of two or more runs from foam cover time to foam breakup time. Useful polymers or polymer mixtures may have foam lives equal to or greater than 30 minutes, 40 minutes, 50 minutes, 60 minutes or more. After about 60 minutes, or other allotted time period, the remaining foam is decanted from the beaker and weighed.

By way of example, the Blank A formula discussed below had a foam life of only 6.7 minutes and all foam was gone by 7.5 minutes.

5. The UL162 Type III, Class B, Topside, Fire Test (Heptane) for AFFF Agents.

This test may be used to test synthetic liquid concentrates as premixes in tap water and synthetic sea water. In the examples presented herein, this test was used for 3% synthetic liquid concentrates. For each fire test, 55 gallons of heptane is charged to a 50 $ft^2$ heavy steel UL pan with enough water in the bottom to give at least eight inches of sideboard. A US military type aspirating nozzle adjusted to give a 2.0 gallon per minute flow rate is placed on a stand. The fire is lit, allowed to burn for 60 seconds, and then foam is directed directly onto the surface of the fuel until the fire is about 75% extinguished. Thereafter, the nozzle may be moved to direct the foam stream back and forth across the surface until approximately 90% extinguishment (control time) is obtained, at which time the fire may be fought from two sides of the pan. Times are recorded at 90% control and at extinguishment. Foam application is continued for a total of 3 minutes.

At about 8 minutes, a 1.0 square foot steel stovepipe is placed 1.0 ft from each side of the corner last extinguished and all foam inside the pipe is removed. After waiting 9 minutes from foam shut-off, the fuel inside the pipe is lit and allowed to bum for 1 minute. The pipe is then removed and timing of the burnback is started. When the fire increases to 20% of the pan area, the burnback time is recorded.

Foam quality is measured by taking the expansion ratio and drain time from the nozzle after running the fire test.

An AFFF product passes the UL162 Type III, Class B, topside, fire test by extinguishing before 3 minutes and having a burnback equal to or greater than 5 minutes. Stronger products give shorter extinguishing and longer burnback times.

6. The UL162 Type II, Class B Topside Isopropanol Fire Test for AR-AFFF Agents.

This test uses the same 50 $ft^2$ pan as the above heptane test (5) but now the foam is applied to a backboard instead of directly into the fuel. The application rate is 4.5 gpm or 0.09 $gal/ft^2$ from a nozzle placed on a stand. No touching or moving of the nozzle is allowed during foam application. 55 gallons of isopropanol (no water) are placed in the pan, the temperature is taken and the fire is lit. After one minute of preburn, foam application is begun. Foam is applied for five minutes, while Control and Extinguishment times are recorded.

At about 13 minutes from the end of foam application, a 1.0 square foot steel stove pipe is placed 1.0 ft from each side of the corner last extinguished and all foam inside the pipe is removed. After waiting 15 minutes from foam shut-off, the fuel inside the pipe is lit and allowed to burn for 1 minute. The pipe is then removed and timing of the burnback is started. When the fire increases to 20% of the pan area, the burnback time is recorded.

Foam quality is measured by taking the expansion ratio and drain time from the nozzle after running the fire test.

An AR-AFFF (polar) product passes this fire test by extinguishing before 5 minutes and having a burnback equal to or greater than 5 minutes. Stronger products give shorter extinguishing and longer burnback times.

7. The UL162 Type III, Class B, Topside, Fire Test for Fluoroprotein (FP) Agents.

This test may be used to test liquid concentrates as premixes in tap water and synthetic sea water. In the examples presented herein, this test was used on 3% synthetic concentrates. For each fire test, 55 gallons of heptane is charged to a 50 $ft^2$ heavy steel UL pan with enough water in the bottom to give at least eight inches of sideboard. A US military type aspirating nozzle adjusted to give a 3.0 gallon per minute flow rate is placed on a stand. The fire is lit, allowed to burn for 60 seconds, and then foam is directed onto the surface of the fuel until the fire is about 75% extinguished. Thereafter, the nozzle may be moved to direct the foam stream back and forth until approximately 90% extinguishment (control time) is obtained, at which time the fire may be fought from two sides of the pan. Times are recorded at 90% control and at extinguishment. Foam application is continued for a total of 5.0 minutes.

At about 14 minutes, a 1.0 square foot steel stovepipe is placed 1.0 ft from each side of the corner last extinguished and all foam inside the pipe is removed. After waiting 15 minutes from foam shut-off, the fuel inside the pipe is lit and allowed to burn for 1 minute. The pipe is then removed and timing of the burnback is started. When the fire increases to 20% of the pan area, the burnback time is recorded.

Foam quality is measured by taking the expansion ratio and drain time from the nozzle after running the fire test.

A FP product passes this fire test by extinguishing before 5.0 minutes and having a burnback equal to or greater than 5 minutes. Stronger products give shorter extinguishing and longer burnback times. It should be noted that FPs when compared with AFFF agents are applied at a rate of 0.06 $gal/ft^2$ vs 0.04 $gal/ft^2$ and for two minutes longer than AFFF agents; a longer burnback of 21 minutes minimum is required for FPs vs 15 minutes for AFFF agents.

EXAMPLES

Three simple 3% synthetic surfactant concentrates were used for the examples given in this patent application; Blanks A, B, and C are given below.

TABLE 1

| Components | Blank A (as 100%) | Blank B (as 100%) | Blank C (as 100%) |
|---|---|---|---|
| High MW Fluorinated Polymer (HMW-FP) | 0 | 0 | 0 |
| Fluorinated Surfactant | 0 | 0 | 0 |

TABLE 1-continued

| Components | Blank A (as 100%) | Blank B (as 100%) | Blank C (as 100%) |
|---|---|---|---|
| Chemguard HS-100 | 0 | 0.7 | 0 |
| Cocoamidopropyl hydroxyproyl Betaine | 0.8 | 0.8 | 0.8 |
| Sodium Decyl Sulfate | 4.5 | 4.5 | 5.4 |
| Polysaccharide | 0 | 0 | 0.8 |
| Butyl Carbitol | 5.0 | 5.0 | 5.0 |
| Magnesium Sulfate | 2.0 | 2.0 | 2.0 |
| Water | 87.7 | 87.0 | 86.0 |

Chemguard HS-100 is a commercially available anionic hydrocarbon surfactant manufactured by Chemguard Inc. at 45% solids in water. The cocoamidopropyl hydroxyproyl betaine used was that available as Chembetaine CAS, which is a 50% solids cocoamidopropyl hydroxypropyl sulfobetane, available from Chemron. The sodium decyl sulfate used was that available as Sulfochem NADS, which is 30% solids sodium decyl sulfate in water, available from Chemron. The polysaccharide was ADM xanthan gum from ADM. Glycol ether DB is butyl carbitol or 2-(2-Butoxyethoxy)ethanol and magnesium sulfate is charged as the heptahydrate.

TABLE 2a

| 3% Non-polar Agents | Blank A | A1 | A2 | A3 | A4a | A4b | A5 |
|---|---|---|---|---|---|---|---|
| High MW Fluorinated Polymer (HMW-FP) | none | 5100 | FP-111 | FP-211 | 5011 | 5011 | EMP68 |
| % Fluorine in conc. | none | 0.30 | 0.30 | 0.40 | 0.27 | 0.45 | 0.37 |
| Tap water tests | | | | | | | |
| Surface Tension* | 24.6 | 21.6 | 20.3 | 22.1 | 24.3 | 24.3 | 23.0 |
| Interfacial Tension** | 0.7 | 2.3 | 2.1 | 2.5 | 3.4 | 3.5 | 2.3 |
| Spreading Coefficient | −0.6 | +0.8 | +2.3 | +0.1 | −3.0 | −3.1 | −0.6 |
| Cyclohexane Seal (%) | <10 | <10 | <10 | <10 | <10 | <10 | <10 |
| Flash Test | Fail | Fail | Fail | Fail | Fail | Fail | Fail |

*dynes/cm;
**dynes/cm, against cyclohexane

TABLE 2b

| 3% Non-polar Agents | Blank A | A6 | A7 | A8 |
|---|---|---|---|---|
| High MW Fluorinated Polymer (HMW-FP) | none | 5100/FP-111 | 5100/FP-211 | 5100/5011 |
| % Fluorine in conc. | none | 0.15/0.15 | 0.15/0.20 | 0.15/0.14 |
| Tap water tests | | | | |
| Surface Tension* | 24.6 | 20.3 | 21.6 | 23.1 |
| Interfacial Tension** | 0.7 | 2.4 | 2.3 | 2.7 |
| Spreading Coefficient | −0.6 | +2.0 | +0.8 | −1.1 |
| Cyclohexane Seal (%) | <10 | <10 | <10 | <10 |
| Flash Test | Fail | Fail | Fail | Fail |

*dynes/cm;
**dynes/cm, against cyclohexane

TABLE 2c

| 3% Non-polar Agents | Blank B | B1 | B2 | B3 | B4a |
|---|---|---|---|---|---|
| High MW Fluorinated Polymer (HMW-FP) | none | 5100 | FP-111 | FP-211 | 5011 |
| % Fluorine in conc. | none | 0.30 | 0.30 | 0.40 | 0.27 |
| Tap water tests | | | | | |
| Surface Tension* | 24.8 | 22.5 | 20.4 | 19.6 | 24.4 |
| Interfacial Tension** | 3.0 | 2.3 | 2.3 | 2.2 | 2.3 |
| Spreading Coefficient | −3.1 | −0.1 | +2.0 | +2.9 | −2.0 |
| Cyclohexane Seal (%) | <10 | <10 | <10 | <10 | <10 |
| Flash Test | Fail | Fail | Fail | Fail | Fail |

*dynes/cm;
**dynes/cm, against cyclohexane

Lodyne 5100, is available from Ciba Specialty Chemicals Corporation, and contains 6.5% fluorine as is. Chemguard FP-111 and Chemguard FP-211 by assay had 3.3% fluorine as is, each. Dynax 5011 from Dynax Corporation by assay had 6.3% fluorine as is, while Atofina's Forafac EMP68-II had 6.2% fluorine as is.

TABLE 3a

Hot Heptane Foam Stability Test

| 3% Non-polar Agents | Blank A | A1 | A2 | A3 | A4a | A4b | A5 |
|---|---|---|---|---|---|---|---|
| Foam Life (min.) | 6.7 | >60 | >60 | >60 | 7.7 | 16.2 | 20.0 |
| Foam Weight (gm) | 0 | 3.6 | 4.1 | 2.4 | 0 | 0 | 0 |

TABLE 3b

Hot Heptane Foam Stability Test

| | A6 | A7 | A8 |
|---|---|---|---|
| Foam Life (min.) | >60 | >60 | >60 |
| Foam Weight (gm) | 3.5 | 4.7 | 3.5 |

TABLE 4a

UL 162 Type III, Class B, Heptane Fire Tests, 3% Tap, 0.04 gal/ft$^2$

| 3% Non-polar Agents | Blank A | A1 | A2 | A3 | A4a | A4b | A5 |
|---|---|---|---|---|---|---|---|
| Heptane,° F. | 86 | 81 | 81 | 82 | 77 | 81 | 79 |
| Water,° F. | 86 | 81 | 84 | 86 | 77 | 84 | 84 |
| Control Time* | 2.8 | 1.7 | 1.8 | 1.2 | 1.5 | 1.3 | 1.8 |
| Extinguish. Time* | None | 2.8 | 2.7 | 2.0 | 2.4 | 2.3 | 3.2 |
| Burnback Time* | N/R | >9.0[1] | 8.0 | >10.0[2] | 0 | 0 | 0 |
| Foam Exp. | 6.7 | 6.9 | 5.6 | 9.3 | 9.2 | 9.1 | 5.7 |
| Foam ¼ Drain* | 4.2 | 3.4 | 2.6 | 3.4 | 3.7 | 3.6 | 3.2 |

*Time in minutes,
[1]15% burnback area at 9.0 min.,
[2]0.1% burnback area at 10 min.

TABLE 4b

UL 162 Type III, Class B, Heptane Fire Tests, 3% Tap, 0.04 gal/ft$^2$

| 3% Non-polar Agents | Blank A | A6 | A7 | A8 |
|---|---|---|---|---|
| Heptane, ° F. | 86 | 82 | 77 | 81 |
| Water, ° F. | 86 | 84 | 81 | 82 |
| Control Time* | 2.8 | 1.9 | 1.3 | 1.3 |
| Extinguish. Time* | None | 3.0 | 2.1 | 2.3 |
| Burnback Time* | N/R | 6.8 | 7.6 | 7.3 |
| Foam Exp. | 6.7 | 5.6 | 8.6 | 8.0 |
| Foam ¼ Drain* | 4.2 | 3.1 | 3.4 | 3.6 |

*Time in minutes

TABLE 5

UL 162 Type III, Class B, Heptane Fire Tests, 0.04 gal/ft$^2$

| 3% Non-polar Agents | Blank B | B1 | B2 | B3 | B1 | B2 |
|---|---|---|---|---|---|---|
| Water Type | Tap | Tap | Tap | Tap | Sea | Sea |
| Heptane, ° F. | 82 | 81 | 80 | 81 | 82 | 75 |
| Water, ° F. | 90 | 86 | 80 | 86 | 90 | 79 |
| Control Time* | 1.3 | 1.0 | 1.1 | 1.3 | 1.1 | 1.0 |
| Extinguish. Time* | None | 2.0 | 2.2 | 2.3 | 2.0 | 1.8 |
| Burnback Time* | N/R | >8.0[1] | >9.0[2] | 7.0 | 5.7 | >8.0 |
| Foam Exp. | 6.1 | 8.6 | 7.3 | 8.3 | 7.3 | 6.3 |
| Foam ¼ Drain* | 4.0 | 3.4 | 5.1 | 4.3 | 4.5 | 3.5 |

*Time in minutes,
[1]Only 6% burning at 8.0 min.,
[2]Only 1% burning at 9.0 min.

TABLE 6

UL 162 Type III, Class B, Heptane Fire Tests, 3% Tap, 0.04 gal/ft$^2$

| | Blank C | C1 | C6 | C8 |
|---|---|---|---|---|
| HMW-FP | None | 5100 | 5100/FP-111 | 5100/5011 |
| % Fluorine in Conc. | 0 | 0.30 | 0.15/0.15 | 0.15/0.14 |
| Heptane, ° F. | 82 | 81 | 79 | 77 |
| Water, ° F. | 83 | 78 | 78 | 77 |
| Control Time* | 2.8 | 1.4 | 1.9 | 1.2 |
| Extinguish. Time* | None | 2.7 | 3.0 | 2.4 |
| Burnback Time* | N/R | 7.5 | 5.4 | 1.7 |
| Foam Exp. | 8.6 | 6.9 | 5.9 | 8.8 |
| Foam ¼ Drain* | 4.7 | 8.3 | 7.4 | 7.6 |

*Time in minutes

TABLE 7

UL 162 Type II, Class B, Isopropanol Fire Tests, 3% in Tap Water, 0.09 gal/ft$^2$

| 3 × 3 Polar Agents | Blank C | C1 | C6 | C7 | C8 |
|---|---|---|---|---|---|
| HMW-FP | None | 5100 | 5100/ FP-111 | 5100/ FP-211 | 5100/ 5011 |
| % Fluorine in Conc. | 0 | 0.30 | 0.15/0.15 | 0.15/0.20 | 0.15/0.14 |
| IPA, ° F. | 73 | 82 | 52 | 58 | 60 |
| Control Time* | none[1] | 1.7 | 1.3 | 1.3 | 1.4 |
| Extinguish. Time* | Only 2%[1] | 3.0 | 2.5 | 2.3 | 2.8 |
| Burnback Time* | N/R | 7.2 | 6.2 | 9.8 | 1.8 |
| Foam Exp. | 9.5 | 7.5 | 6.3 | 7.4 | 8.8 |
| Foam /1/4 Drain* | 6.5 | 7.2 | 6.0 | 5.7 | 5.4 |

*Time in minutes,
[1]After 3.3 minutes of foam application, only 2% extinguished so stopped test with backup unit.

TABLE 8a

UL 162 Type III, Class B, Heptane Fire Tests, 0.04 gal/ft$^2$

| 3% Non-polar Agents | A9 | A9 | A10 | A10 | A11 |
|---|---|---|---|---|---|
| Components | A1 + 1157N | A1 + 1157N | A2 + 1157N | A2 + 1157N | A + 1157N |
| % Fluorine in conc. | 0.30/0.10 | 0.30/0.10 | 0.30/0.10 | 0.30/0.10 | 0.10 |
| Water Type | Tap | Sea | Tap | Sea | Tap |
| Heptane, ° F. | 75 | 70 | 77 | 77 | 72 |
| Water, ° F. | 75 | 72 | 84 | 77 | 77 |
| Control Time** | 1.2 | 1.1 | 1.1 | 1.1 | 1.6 |
| Extinguish. Time** | 2.3 | 2.7 | 2.5 | 2.2 | 2.8 |

TABLE 8a-continued

| UL 162 Type III, Class B, Heptane Fire Tests, 0.04 gal/ft$^2$ | | | | | |
|---|---|---|---|---|---|
| 3% Non-polar Agents | A9 | A9 | A10 | A10 | A11 |
| Burnback Time** | 8.2 | 8.2 | 16.5 | 8.5 | 2.2 |
| Foam Exp. | 7.6 | 6.8 | 5.9 | 5.3 | 8.3 |
| Foam ¼ Drain** | 2.7 | 4.0 | 3.7 | 3.2 | 3.0 |
| Surface Tension | 21.0 | — | 20.2 | — | 19.8 |
| Interfacial Tension | 2.7 | — | 2.6 | — | 1.8 |
| Spreading Coeffic. | +1.0 | — | +1.9 | — | +3.1 |

*Dashed line indicates no data available.
**Time in minutes

TABLE 8b*

| UL 162 Type III, Class B, Heptane Fire Tests, 0.04 gal/ft$^2$ | | | | |
|---|---|---|---|---|
| 3% Non-polar Agents | A12 | A12 | A13 | A14 |
| Components | A + 1157N | A + 1157N | A + 1157N | A + 1157N |
| % Fluorine in conc. | 0.20 | 0.20 | 0.30 | 0.40 |
| Water Type | Tap | Sea | Sea | Sea |
| Heptane, ° F. | 77 | 78 | 78 | 78 |
| Water, ° F. | 83 | 85 | 85 | 88 |
| Control Time** | 1.3 | 1.2 | 1.0 | 0.9 |
| Extinguish. Time** | 2.4 | 2.0 | 1.7 | 1.4 |
| Burnback Time** | 6.1 | 3.4 | 3.7 | 7.6 |
| Foam Exp. | 8.5 | 9.1 | 8.6 | 8.5 |
| Foam ¼ Drain** | 3.3 | 2.7 | 2.7 | 2.4 |
| Surface Tension | 18.7[1] | — | 18.5[1] | 18.3[1] |
| Interfacial Tension | 2.3[1] | — | 2.3[1] | 2.3[1] |
| Spreading Coeffic. | +3.7[1] | — | +3.9[1] | +4.1[1] |

*Dashed line indicates no data available.
**Time in minutes,
[1]Measured in tap water Blanks A, B and C The compositions of examples Blank A, B, and C are given in Table 1. Blank A is the surfactant concentrate used for evaluation of HMW-FP as in Tables 3a and 3b using the Hot Heptane Foam Stability Test. This is a basic concentrate and not an optimized concentrate. The HMW-FP, including single products or mixtures, may be evaluated at from about 0.3% to 0.5% fluorine content on "as is" 3% Synthetic Liquid Foam Concentrate.

Blank A (Table 3A) gave only 6.7 minutes of foam life as determined by the Hot Heptane Foam Stability Test (Test 4) and failed the UL162 Class B fire test (Table 4a). At 3.0 minutes, Blank A had only extinguished 95% of the fire and only 98% when the foam ran out at 3.8 minutes, therefore, no burnback test could be run. At 5.0 minutes after stopping foam application, all of the foam had disappeared. This performance is exemplary of Class A and UL wetting type foams on Class B fuels at 2 gpm (0.04 gal/ft$^2$). Typically, Class A foams require higher application rates of from 3.0–5.0 gpm to extinguish the Class B fire within 3.0 minutes. However, even at this higher application rate, Class A foams typically have no foam left on the fuel at the start of burnback time.

In the UL162 Class B fire test, Blank B, which utilized Blank A plus 0.8% solids Chemguard HS-100, the fire was 99.5% extinguished at 3.0 minutes, but candles along the edge continued to burn and increased in intensity after 1.0 minutes, therefore, the burnback could not be run.

Blank C (Table 1), which utilized Blank A plus 0.8% solids polysaccharide and 0.9% Chembetaine CAS, only extinguished 90% of the UL162 Class B fire (Table 6) at 3.0 minutes. Blank C, therefore, failed the UL162 Class B heptane fire test.

Samples A1–A8

The compositions of Samples A1–A8 are given in Table 1, 2a, and 2b. All of these concentrates were prepared by the addition of the HMW-FP to Blank A: Lodyne 5100, Chemguard FP-111, Chemguard FP-211, Dynax 5011, Forafac EMP68-II, and mixtures thereof.

The surface and interfacial tensions measured in tap water against air and cyclohexane, respectively, are given in Tables 2a and 2b. It was noted that Blank A had both the highest surface tension and the lowest interfacial tension and a negative spreading coefficient of −0.6 dynes/cm. Of the compositions containing the fluorinated polymers, A1–A8, the highest surface tension was 24.3 dynes/cm (A4a and A4b with Dynax 5011) and the lowest was 20.3 dynes/cm (A2 and A6 with Chemguard FP-111). There was less spread in the interfacial tensions with a high of 3.5 dynes/cm and a low of 2.1 dynes/cm. Therefore, the spreading coefficients were calculated as low as −3.1 dynes/cm to, as great as, +2.3 dynes/cm. However, although 5 of the 10 compositions had positive spreading coefficients, none of the premixes spread more than 10% on heptane and all immediately flashed and burned when a flame approached the cyclohexane surface.

Those samples that did not contain fluorochemical surfactant, while in some cases having positive spreading coefficients, did not seal on cyclohexane nor prevent vapor flashing and burning. They thus are not AFFF compositions by definition.

The Hot Heptane Foam Stability Test (Test 4) for samples A1–A8 (Tables 3a and 3b) was used to select suitable HMW-FPs. HMW-FP, including single products or mixtures, may be evaluated at from about 0.3% and 0.5% fluorine content on "as is" 3% Synthetic Liquid Foam Concentrate. From Tables 3a and 3b it is seen that six of the ten samples had foam lives exceeding 60 minutes. Samples A4a and A4b, containing Dynax 5011, sample A5, containing Forafac EMP68-II, and Blank A each had a foam life that was under 60 minutes, and even under 30 minutes.

It was found that a 50/50 mixture of Lodyne 5100/Dynax 5011 (Sample A8), however, did provide a foam life of greater than 60 minutes, as did mixtures of Lodyne 5100/Chemguard FP-111 (Sample A6) and Lodyne 5100/Chemguard FP-211 (A7).

Tables 4a and 4b set forth UL162 Type III, Class B, fire tests run on 55 gallons of heptane in a 50 square foot UL steel, square, pan. The foam application rate was 2.0 gpm or 0.04 gal/ft$^2$. All fires were run on fuel at 77–86° F. and lower water layer at 77–86° F. Blank A and A5 were the only 3% concentrates failing to extinguish the fire within the required 3.0 minute period. Blank A also failed the required burnback test (5.0 min.), as did A4a, A4b, and A5. This was expected based on their poor performance on the hot heptane test with foam lives much less than 60 minutes or even 30 minutes. In effect, compositions which cannot last for 60 minutes or even 30 minutes on the hot heptane test may not have the foam stability necessary to meet the burnback test requirements on UL162, equivalent to 15 minutes hold after stopping foam application.

Exceptional burnback performance was noted with A1, A2 and A3 compositions with Lodyne 5100 and Chemguard FP-111 and FP-211. They had better burnback performance than many AFFF agents containing more than 0.4% fluorine on solids in the form of fluorochemical surfactants. The foam expansion ratios and drain times were well within values expected for good fire extinguishing agents.

Compositions A1, A2, A3, A6, A7, and A8 met the requirements for the UL162 Class B fire test for AFFF agents at only 0.30 to 0.40% fluorine, although not being classified as such.

Samples B1–B4a

The compositions of samples B1–B4a are given in Tables 1 and 2c. All of these concentrates are prepared by the addition of the following HMW-FP to Blank B: Lodyne 5100, Chemguard FP-111, Chemguard FP-211, and Dynax 5011.

The surface and interfacial tensions measured in tap water against air and cyclohexane, respectively, are given in Table 2c. It should be noted that Blank B had both the highest surface tension and the highest interfacial tension and a negative spreading coefficient of −3.1 dynes/cm. Of the compositions containing the fluorinated polymers, B1–B4a, the highest surface tension was 24.4 dynes/cm (B4a with Dynax 5011) and the lowest was 19.6 dynes/cm (B3 with Chemguard FP-211). There was less spread in the interfacial tensions with a high of 3.0 dynes/cm and a low of 2.2 dynes/cm. Therefore, the spreading coefficients were calculated as low as −3.1 dynes/cm to as great as +2.9 dynes/cm. However, although 2 of the 5 compositions had positive spreading coefficients, none of the premixes spread more than 10% on heptane and all immediately flashed and burned when a flame approached the cyclohexane surface.

The compositions not containing fluorochemical surfactant, while in some cases having positive spreading coefficient, did not seal on cyclohexane nor prevent vapor flashing and burning.

From Table 5, only Blank B failed the UL162 fire test (i.e. extinguishing time <3 min, burnback time >5 min), while all compositions containing HMW-FP chosen from the hot heptane test (Test 4) of Tables 3a and 3b readily passed. It should be noted that including Chemguard HS-100 in Blank B in general gave faster control times and extinguishing times. Comparing sample A1 with B1 and A2 with B2, extinguishing times were reduced by 0.8 and 0.5 minutes, respectively. Again, burnback performance was exceptional for B1 and B2 made with Lodyne 5100 and Chemguard FP-111.

Table 5 shows sea water performance data for B1 and B2, which fully meet the requirements of the UL162 Class B fire test for AFFF agents.

Samples C1, C6, C7, C8

Polar type fire extinguishing agents can be readily prepared using the HMW-FPs as described herein. These compositions, known as 3×3 products may be used at 3% dilution rate on both polar and non-polar fires. The compositions of examples C1, C6, C7 and C8 are given in Tables 1, 6, and 7. All of these concentrates are prepared by the addition of the following HMW-FPs to Blank C: Lodyne 5100, and mixtures of Lodyne 5100 and Chemguard FP-111, Chemguard FP-211, and Dynax 5011. Blank C is similar to Blank A with the addition of only 0.8% solids of polysaccharide and 0.9% solids of Chembetaine CAS. The polysaccharide content was held low to get a better measure for the strength of the HMW-FPs to form vapor barriers on isopropanol.

Table 6 shows UL162 Type III Class B heptane fire tests with Blank C, C1, C6, and C8; all at 3%. Blank C did not extinguish the fire, therefore no burnback was run. C8 gave good extinguishment but failed the burnback test. C1 and C6 passed all UL162 Type III ClassB fire performance requirements although C6 barely passed the extinguishing time. Based on the data from the Chemguard HS-100 formulations, it is expected that the C-formulations could be speeded up (extinguishment) with the addition of this hydrocarbon surfactant.

Table 7 describes UL162 Type II Class B fire tests on isopropanol at 4.5 gpm or 0.09 gal/ft$^2$ application density as described above (Test 6); all at 3%. Blank C failed fire performance by not controlling the isopropanol fire. The necessity for extra foam stabilizer as described in the art is demonstrated in this failure. Samples C1, C6, C7 and C8 passed all Class B fire test requirements with good extinguishing and burnback times. Only C8 containing a mixture of Lodyne 5100 and Dynax 5011 failed the test and then only the burnback.

Samples A9–A14

Tables 8a and 8b contain data showing UL162 Class B heptane fire performance when low levels of Forafac 1157N are added to compositions A1 and A2. Forafac 1157N, manufactured by Atofina, is an amphoteric fluorochemical surfactant used for AFFF and AR-AFFF agents. The lowest fluorine content 3% UL listed AFFF product using only Forafac 1157N is known to contain 0.43% fluorine.

Samples A9 and A10 are equivalent to A1 and A2 with the addition of only 0.10% fluorine from Forafac 1157N to each. Note that fire extinguishing times were reduced, while burnback times were increased. A2 in tap water had a 16.5 minute burnback time. Performance in both sea and tap water were similar. This performance was obtained in spite of no appreciable change in the spreading coefficients for A1 conversion to A9 going from +1.6 to +1.8 dynes/cm. The spreading coefficient for A2 conversion to A10 dropped, going from +3.1 (A2) to +2.7 (A10) dynes/cm.

It was noted that neither A9 nor A10 spread on cyclohexane and flashing occurred immediately on flame testing. Therefore neither of these compositions, despite the presence of fluorosurfactant at 0.10% fluorine level in the 3% concentrate, can be considered AFFF agents.

Examples A11 through A14 have only fluorosurfactant added to Blank A; no HMW-FP is added. A12 with 0.20% fluorine from Forafac 1157N was the first 3% composition to pass the UL162 Class B fire test, but only in tap water; the sea water fire test with A12 did not pass the burnback specification by failing at 3.4 minutes. A13 at 0.30% fluorine also failed the burnback test in sea water. A pass was not obtained in sea water until A14, when Forafac 1157N was charged at a level of 0.40% fluorine in the 3% concentrate.

Even at such a high level of fluorosurfactant, A14 still had a poorer burnback than either A9 or A10 with only 0.10% fluorine as fluorosurfactant. Furthermore, A14 would not make an acceptable 3×3 polar agent merely on addition of 0.8% polysaccharide and 0.9% Chembetaine CAS as did Synthetic 3% concentrates A1, A6 and A7 on conversion to C1, C6 and C7 with only 0.30% fluorine as polymer.

Cyclohexane seal tests were run on A11 through A14 at 3% in tap water to determine AFFF properties. A11 at 0.10% fluorine did not seal and immediately flashed on attempted ignition. A12, at 0.20% fluorine, spread on cyclohexane, but immediately flashed on attempted ignition. A13 (0.30% fluorine) and A14 (0.40% fluorine), both sealed on cyclohexane and passed the ignition test. Therefore, a minimum Forafac 1157N fluorosurfactant level equal to 0.30% fluorine was required to give a true AFFF agent using Blank A. Yet acceptable UL162 burnback performance in sea water was not obtained until the fluorosurfactant was present at 0.40% fluorine. Note that an SC of 3.9–4.1 was required to get AFFF agent performance on the cyclohexane seal test.

Samples D1–D3

TABLE 9

UL 162 Type III, Class B, Heptane Fire Tests, 3% tap, 0.06 gal/ft$^2$

| Components | D1 (as is %) | D2 (as is %) | D3 (as is %) |
|---|---|---|---|
| Chemguard FP-111 | 2.0 | 2.0 | 2.0 |
| Fluorinated Surfactant | 0 | 0 | 0 |
| Chemguard HS-100 | 0 | 0 | 1.5 |
| Chembetaine CAS | 1.6 | 1.6 | 0 |
| Glucopon 325N | 0 | 0 | 2.0 |
| Sulfochem NOS | 5.0 | 5.0 | 0 |
| Sulfochem NADS | 19.5 | 15.0 | 15.0 |
| Urea | 10.0 | 10.0 | 0 |
| Busan 1024 | 0 | 0.1 | 0 |
| Polysaccharide | 0 | 0.6 | 0 |
| Glycol ether DB | 5.0 | 5.0 | 5.0 |
| Magnesium Sulfate | 2.0 | 2.0 | 2.0 |
| Water | 54.9 | 58.7 | 72.5 |
| Fire Performance, Tap | | | |
| Temp. (heptane/water, ° F.) | 65/65 | 55/55 | 75/81 |
| Control Time (min.) | 1.1 | 1.0 | 2.7 |
| Extinguishment Time (min.) | 2.3 | 2.9 | 4.3 |
| Burnback Time (min.) | >10.0[1] | SE@0.8[2] | >9.0[3] |
| Foam Expansion Ratio | 6.4 | 5.2 | 7.5 |
| Foam ¼ Drain Time (min.) | 3.8 | 7.2 | 2.4 |

[1]Only 8% burning at 10.0 min.;
[2]SE = Self Extinguish.;
[3]Only 5% burning at 9.0 min.

The UL162 Type III, Class B fire test recognizes a difference between AFFF and FP type fire extinguishing agents. AFFF agents must extinguish in 3.0 minutes or less at an application density of only 0.04 gal/ft$^2$, while FP agents only need to extinguish in 5.0 minutes at an application density of 0.06 gal/ft$^2$. This means 6.0 gallons of premix are used for AFFF while 15.0 gallons of premix are applied for FP agents. As noted above, however, the burnback requirements for FP agents are more severe than for AFFF agents. FP agents must have a minimum of 21 minutes burnback from time of foam shutoff compared to 15 minutes minimum burnback for AFFF agents.

From the data shown in Table 9, it can be seen that Compositions D1, D2 and D3 meet both the extinguishing and burnback requirements of the UL162 fire test on heptane at 0.06 gal/ft$^2$ application density. D3 was slower to extinguish than D1 or D2, but still had excellent burnback, demonstrating remarkable foam stability on hot heptane. At the start of the burnback test on D3, the heptane still registered 127° F., yet 100% of the heptane was covered with resilient foam which continued to resist burnback to only 5% area involvement after 9 minutes. This is equivalent to greater than 25 minutes burnback versus 21 minutes required.

Only 2% of "as is" Chemguard FP-111 (HMW-FP, 0.067% fluorine) was required for meeting the UL FP agent performance requirement compared with about 0.30% fluorine for a composition to meet AFFF type performance criteria. Fluoroprotein products are expected to work well for subsurface tank injection to extinguish tank fires in a manner similar to commercial FP agents prepared from protein concentrate. The difference being that this product does not contain protein concentrate, zinc, and iron as do most FP agents, and therefore, the formulations of this invention are much more environmentally friendly.

The fire fighting compositions utilizing the high molecular weight fluoropolymers, as described herein, may be applied to liquid hydrocarbons, both polar and non-polar, to extinguish such liquids during burning and that may provide a durable vapor barrier of foam on the surface of such liquids to prevent or reduce the release of combustible vapors therefrom. The composition may be applied both to the surface of such liquids or may be introduced below the surface, such as through injection. The composition may be applied in combination with other fire fighting agents, if necessary, such as the dual-agent application of both foam and a dry chemical or powder fire fighting agents. An example of such a dry chemical or powder agent is that available commercially as Purple K. In such dual application, the fire fighting agents may be applied through the use of adjacent or as generally concentric nozzles. In some instances, the dry or powder agent may be applied alone to initially extinguish any flame, with the foam being applied to prevent reigniting of the fuel.

While the invention has been shown in some of its forms, it should be apparent to those skilled in the art that it is not so limited, but is susceptible to various changes and modifications without departing from the scope of the invention. Accordingly, it is appropriate that the appended claims should be construed broadly and in a manner to encompass such changes and modifications consistent with the scope of the invention.

I claim:

1. A fire fighting composition comprising water, a hydrocarbon surfactant and a high molecular weight fluoropolymer having an average molecular weight of at least 3000 g/mol in an amount wherein the composition does not form a stable seal on cyclohexane and meets UL162, Class B performance criteria for AFFF agents.

2. The fire fighting composition of claim 1, further comprising a fluorochemical surfactant.

3. The composition of claim 1, wherein the composition contains less than about 0.008% fluorine by weight provided from any fluorochemical surfactant.

4. The composition of claim 1, further comprising a fluorochemical surfactant in an amount of from 0.001 to 0.008% fluorine by weight of the fire fighting composition.

5. The composition of claim 1, wherein:

the fire fighting composition meets UL162, Class B performance criteria for at least two of AFFF agents, AR-AFFF agents and FP agents.

6. The composition of claim 1, wherein:
the fire fighting composition meets UL162, Class B performance criteria for AFFF agents, AR-AFFF agents and fluoroprotein (FP) agents.

7. The composition of claim 1, wherein the high molecular weight fluoropolymer has an avenge molecular weight of at least 5000 g/mol.

8. The composition of claim 1, wherein the fluoropolymer provides a foam life of at least 30 minutes without fluorochemical surfactants.

9. The composition of claim 1, wherein the fire fighting composition has a spreading coefficient (SC) against cyclohexane of from about −4 or more.

10. The composition of claim 1, wherein:
the fluoropolymer provides the composition with from about 0.0003% or more fluorine by weight of the composition.

11. The composition of claim 1, wherein:
the fluoropolymer provides the composition with from about 0.045% or less fluorine by weight of the composition.

12. The composition of claim 1, wherein:
the fluoropolymer provides the composition with from about 0.0003% to about 0.045% fluorine by weight of the composition.

13. The composition of claim 1, wherein:
the high molecular weight fluoropolymer has an average molecular weight of at least 10,000 g/mol.

14. A fire fighting composition comprising water, a hydrocarbon surfactant and a high molecular weight fluoropolymer having an average molecular weight of at least 3000 g/mol in an amount wherein the composition has a spreading coefficient (SC) against cyclohexane of from −4 to less than +3.5 and does not form a stable seal on cyclohexane and meets UL162, Class B performance criteria for AFFF agents.

15. The composition of claim 14, wherein the composition contains less than about 0.008% fluorine by weight provided from any fluorochemical surfactant.

16. The composition of claim 14, further comprising a fluorochemical surfactant in an amount of from 0.001 to 0.008% fluorine by weight of the fire fighting composition.

17. The composition of claim 14, wherein:
the fire fighting composition meets UL162, Class B performance criteria for at least two of AFFF agents, AR-AFFF agents and FP agents.

18. The composition of claim 14, wherein:
the fire fighting composition meets UL162, Class B performance criteria for AFFF agents, AR-AFFF agents and fluoroprotein (FP) agents.

19. The composition of claim 14, wherein the high molecular weight fluoropolymer has an average molecular weight of at least 5000 g/mol.

20. The composition of claim 14, wherein the fluoropolymer provides a foam life of at least 30 minutes without fluorochemical surfactants.

21. The composition of claim 14, wherein:
the fluoropolymer provides the composition with from about 0.0003% or more fluorine by weight of the composition.

22. The composition of claim 14, wherein:
the fluoropolymer provides the composition with from about 0.045% or less fluorine by weight of the composition.

23. The composition of claim 14, wherein:
the fluoropolymer provides the composition with from about 0.0003% to about 0.045% fluorine by weight of the composition.

24. The composition of claim 14, wherein:
the high molecular weight fluoropolymer has an avenge molecular weight of at least 10,000 g/mol.

25. A fire fighting composition comprising water, a hydrocarbon surfactant and a high molecular weight fluoropolymer having an average molecular weight of at least 3000 g/mol in an amount wherein the composition does not form a stable seal on cyclohexane and meets UL162, Class B performance criteria for AFFF agents, and wherein the composition has no fluorine content provided from any fluorochemical surfactant.

26. The composition of claim 25, wherein:
the fire fighting composition meets UL162, Class B performance criteria for at least two of AFFF agents, AR-AFFF agents and FP agents.

27. The composition of claim 25, wherein:
the fire fighting composition meets UL162, Class B performance criteria for AFFF agents, AR-AFFF agents and fluoroprotein (FP) agents.

28. The composition of claim 25, wherein the high molecular weight fluoropolymer has an average molecular weight of at least 5000 g/mol.

29. The composition of claim 25, wherein the fluoropolymer provides a foam life of at least 30 minutes.

30. The composition of claim 25, wherein:
the fluoropolymer provides the composition with from about 0.0003% or more fluorine by weight of the composition.

31. The composition of claim 25, wherein:
the fluoropolymer provides the composition with from about 0.045% or less fluorine by weight of the composition.

32. The composition of claim 25, wherein:
the fluoropolymer provides the composition with from about 0.0003% to about 0.045% fluorine by weight of the composition.

33. The composition of claim 25, wherein:
the high molecular weight fluoropolymer has an avenge molecular weight of at least 10,000 g/mol.

* * * * *

UNITED STATES PATENT AND TRADEMARK OFFICE

CERTIFICATE OF CORRECTION

PATENT NO. : 7,011,763 B2
APPLICATION NO. : 10/213763
DATED : March 14, 2006
INVENTOR(S) : Kirtland P. Clark It is certified that error appears in the above-identified patent and that said Letters Patent is hereby corrected as shown below:

In the claims:

In column 21, line 6, please replace “avenge” with the word --average--.

In column 22, line 14, please replace “avenge” with the word --average--.

In column 22, line 53, please replace “avenge” with the word --average--.

Signed and Sealed this

Twenty-second Day of August, 2006

JON W. DUDAS
*Director of the United States Patent and Trademark Office*

UNITED STATES PATENT AND TRADEMARK OFFICE

CERTIFICATE OF CORRECTION

PATENT NO. : 7,011,763 B2 
APPLICATION NO. : 10/213703
DATED : March 14, 2006
INVENTOR(S) : Kirtland P. Clark It is certified that error appears in the above-identified patent and that said Letters Patent is hereby corrected as shown below:

In the claims:

In column 21, line 6, please replace “avenge” with the word --average--.

In column 22, line 14, please replace “avenge” with the word --average--.

In column 22, line 53, please replace “avenge” with the word --average--.

This certificate supersedes Certificate of Correction issued August 22, 2006.

Signed and Sealed this

Tenth Day of October, 2006

JON W. DUDAS

*Director of the United States Patent and Trademark Office*